United States Patent
Kitao et al.

(10) Patent No.: US 9,941,521 B2
(45) Date of Patent: Apr. 10, 2018

(54) METHOD FOR PRODUCING CORE-SHELL CATALYST

(71) Applicant: TOYOTA JIDOSHA KABUSHIKI KAISHA, Toyota-shi, Aichi-ken (JP)

(72) Inventors: Noriyuki Kitao, Shizuoka-ken (JP); Naoyuki Sasaki, Susono (JP); Tsugio Fujisawa, Fuji (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/313,264

(22) PCT Filed: Apr. 3, 2015

(86) PCT No.: PCT/JP2015/060604
§ 371 (c)(1),
(2) Date: Nov. 22, 2016

(87) PCT Pub. No.: WO2015/182245
PCT Pub. Date: Dec. 3, 2015

(65) Prior Publication Data
US 2017/0214060 A1    Jul. 27, 2017

(30) Foreign Application Priority Data

May 28, 2014 (JP) ................. 2014-110303

(51) Int. Cl.
*C23C 18/16* (2006.01)
*C23C 18/18* (2006.01)
(Continued)

(52) U.S. Cl.
CPC .......... *H01M 4/8853* (2013.01); *C23C 18/16* (2013.01); *C23C 18/1671* (2013.01);
(Continued)

(58) Field of Classification Search
USPC .......................................... 205/85
See application file for complete search history.

(56) References Cited

U.S. PATENT DOCUMENTS 9,803,285 B1 * 10/2017 Robinson ................ C23C 28/00
2012/0010069 A1    1/2012 Takehiro et al.
(Continued)

FOREIGN PATENT DOCUMENTS

JP    2012-016684 A    1/2012
JP    2013-215701 A    10/2013
JP    2015-047536 A    3/2015

*Primary Examiner* — Brian W Cohen
(74) *Attorney, Agent, or Firm* — Andrews Kurth Kenyon LLP

(57) ABSTRACT

The disclosure is to provide a method for producing a core-shell catalyst that is able to increase the power generation performance of a membrane electrode assembly. A dispersion is prepared, in which a palladium-containing particle support, in which palladium-containing particles are supported on an electroconductive support, is dispersed in water; hydrogen gas is bubbled into the dispersion; the palladium-containing particles are acid treated after the bubbling; copper is deposited on the surface of the palladium-containing particles by applying a potential that is nobler than the oxidation reduction potential of copper to the palladium-containing particles in a copper ion-containing electrolyte after the acid treatment; and then a shell is formed by substituting the copper deposited on the surface of the palladium-containing particles with platinum by bringing the copper deposited on the surface of the palladium-containing particles into contact with a platinum ion-containing solution.

4 Claims, 3 Drawing Sheets

(51) Int. Cl.
  *C25D 3/38*   (2006.01)
  *H01M 4/88*   (2006.01)
  *C25D 5/34*   (2006.01)
  *C25D 5/48*   (2006.01)
  *H01M 4/92*   (2006.01)

(52) U.S. Cl.
  CPC ...... *C23C 18/1837* (2013.01); *C23C 18/1844* (2013.01); *C25D 3/38* (2013.01); *C25D 5/34* (2013.01); *C25D 5/48* (2013.01); *H01M 4/925* (2013.01)

(56) References Cited

U.S. PATENT DOCUMENTS

2015/0318560 A1* 11/2015 Kaneko ............... H01M 4/8657
          502/5
2016/0079607 A1* 3/2016 Kaneko ................ H01M 4/925
          429/465

\* cited by examiner

METHOD FOR PRODUCING CORE-SHELL CATALYST

CROSS-REFERENCE TO RELATED APPLICATIONS

This is a national phase application based on the PCT International Patent Application No. PCT/JP2015/060604 filed Apr. 3, 2015, claiming priority to Japanese Patent Application No. 2014-110303 filed May 28, 2014, the entire contents of both of which are incorporated herein by reference.

TECHNICAL FIELD

The present invention relates to a method for producing a core-shell catalyst.

BACKGROUND ART

A fuel cell is a cell in which a fuel and an oxidant are supplied to two electrically-connected electrodes to electrochemically oxidize the fuel, thereby converting chemical energy directly to electrical energy. Accordingly, it is not limited by the Carnot cycle and shows high energy conversion efficiency. A fuel cell generally includes a stack of fuel cells, each having a membrane electrode assembly (MEA) as the basic structure, which is composed of a pair of electrodes and an electrolyte membrane sandwiched therebetween.

As a fuel cell electrode catalyst, a core-shell catalyst directed to the reduction of the amount of a noble metal used (e.g., platinum) is known.

For example, in Patent Literature 1, there is a description of a method for producing a core-shell catalyst by displacement plating using copper underpotential deposition (Cu-UPD).

CITATION LIST

Patent Literature 1: Japanese Patent Application Laid-Open No. 2013-215701

SUMMARY OF INVENTION

Technical Problem

On the surface of a palladium-containing particle support in which palladium-containing particles, which are used as the core material for a core-shell catalyst, are supported on an electroconductive support, fine particles that are palladium-containing particles having a particle diameter of less than 3.0 nm (hereinafter may be referred to as fine palladium-containing particles) exist. The fine palladium-containing particles are composed of low-coordinated atoms. Therefore, in the production of a core-shell catalyst, a platinum-containing shell is likely to be formed segregately on the fine palladium-containing particle surface, and palladium is likely to be exposed on the core-shell catalyst surface.

Such a core-shell catalyst that the shell is not uniformly formed, has the following problem: power generation performance that is equivalent to catalytic activity per unit mass of platinum (hereinafter may be referred to platinum mass activity) and is obtained by an electrochemical measurement using a rotating disk electrode (RDE) when the catalyst is in the form of a powder catalyst, cannot be obtained when it is used in a membrane electrode assembly.

The reason for this is supposed as follows: when palladium is exposed on the core-shell catalyst surface, the palladium is dissolved by battery evaluation (potential variation); meanwhile, in an electrochemical measurement by an RDE, the palladium dissolved during the evaluation is infinitely diffused in an electrolyte, so that it seems that there is no influence of the dissolution of the palladium; however, in a membrane electrode assembly, the palladium dissolved by power generation influences a decrease in the performance of the membrane electrode assembly, such as redeposition on the platinum-containing shell and ionomer poisoning as a cation contaminant.

To inhibit the performance decrease, there is a method of inhibiting the dissolution of the palladium by adding a large amount of platinum to the palladium-containing particles in the production of a core-shell catalyst to increase the coverage of the particles with the platinum. However, in exchange, there is a problem of a decrease in the platinum mass activity of a core-shell catalyst.

To inhibit the dissolution of the palladium from the thus-produced core-shell catalyst, without an increase in the amount of the platinum used in the core-shell catalyst production, there is a method of decreasing the fine palladium-containing particles in advance, which are a source of dissolved palladium. To decrease the fine palladium-containing particles, a high-temperature sintering or acid treatment has been carried out on the palladium-containing particle support before Cu-UPD.

However, the method of high-temperature sintering of the palladium-containing particle support has the following problem: although the fine palladium-containing particles can be decreased by sintering the palladium-containing particles, since the particles grow very fast, an overall increase in particle size occurs and leads to an increase in the standard deviation of the particle size distribution of the palladium-containing particles, so that the platinum mass activity of the core-shell catalyst is decreased.

The method of acid treating the palladium-containing particle support has the following problem: since the fine palladium-containing particles are dissolved, the palladium-containing particle supporting rate is decreased and leads to a waste of the palladium-containing particles.

The present invention was achieved in light of the above circumstance. An object of the present invention is to provide a method for producing a core-shell catalyst that is able to increase the power generation performance of a membrane electrode assembly, by decreasing the fine palladium-containing particles in the palladium-containing particle support, without a decrease in the palladium-containing particle supporting rate of the palladium-containing particle support and without an increase in the standard deviation of the particle size distribution of the palladium-containing particles.

Solution to Problem

The core-shell catalyst production method of the present invention is a method for producing a core-shell catalyst comprising a core containing palladium and a shell containing platinum and covering the core, wherein the method comprises: a step of preparing a dispersion in which a palladium-containing particle support, in which palladium-containing particles are supported on an electroconductive support, is dispersed in water; a bubbling step of bubbling hydrogen gas into the dispersion; an acid treatment step of acid treating the palladium-containing particles after the bubbling step; a copper deposition step of depositing copper on the surface of the palladium-containing particles by applying a potential that is nobler than the oxidation reduction potential of copper to the palladium-containing particles in a copper ion-containing electrolyte after the acid treatment step; and a substitution step of forming the shell by substituting the copper deposited on the surface of the palladium-containing particles after the copper deposition step with platinum by bringing the copper deposited on the surface of the palladium-containing particles into contact with a platinum ion-containing solution.

In the method for producing the core-shell catalyst according to the present invention, it is preferable that the method further comprises a boil-washing step of boil-washing the palladium-containing particles with water after the acid treatment step and before the copper deposition step.

In the method for producing the core-shell catalyst according to the present invention, it is preferable that the acid is at least one selected from the group consisting of sulfuric acid and nitric acid.

In the method for producing the core-shell catalyst according to the present invention, it is preferable that the electroconductive support comprises at least one of a carbonaceous material and a metal material.

Advantageous Effects of Invention

Such a core-shell catalyst can be produced by the present invention, that is able to decrease the fine palladium-containing particles in the palladium-containing particle support, without a decrease in the palladium-containing particle supporting rate of the palladium-containing particle support and without an increase in the standard deviation of the particle size distribution of the palladium-containing particles, and, as a result, that is able to increase the power generation performance of a membrane electrode assembly.

DESCRIPTION OF EMBODIMENTS

The core-shell catalyst production method of the present invention is a method for producing a core-shell catalyst comprising a core containing palladium and a shell containing platinum and covering the core, wherein the method comprises: a step of preparing a dispersion in which a palladium-containing particle support, in which palladium-containing particles are supported on an electroconductive support, is dispersed in water; a bubbling step of bubbling hydrogen gas into the dispersion; an acid treatment step of acid treating the palladium-containing particles after the bubbling step; a copper deposition step of depositing copper on the surface of the palladium-containing particles by applying a potential that is nobler than the oxidation reduction potential of copper to the palladium-containing particles in a copper ion-containing electrolyte after the acid treatment step; and a substitution step of forming the shell by substituting the copper deposited on the surface of the palladium-containing particles after the copper deposition step with platinum by bringing the copper deposited on the surface of the palladium-containing particles into contact with a platinum ion-containing solution.

The inventors of the present invention found that hydrogen is occluded in palladium in relatively-large palladium-containing particles by using the hydrogen occluding property of palladium and bubbling hydrogen into the palladium-containing particle support in water, before the acid treatment of the palladium-containing particle support; thereafter, palladium eluted by the acid treatment can be reduced (redeposited) at the time of washing after the acid treatment (the occluded hydrogen serves as a reductant). Based on this finding, the inventors achieved the present invention.

Such a core-shell catalyst can be produced by the present invention, that is able to decrease the fine palladium-containing particles in the palladium-containing particle support, without a decrease in the palladium-containing particle supporting rate of the palladium-containing particle support and without an increase in the standard deviation of the particle size distribution of the palladium-containing particles, and, as a result, that is able to increase the power generation performance of a membrane electrode assembly.

In the present invention, the state of the core of being covered with the shell encompasses not only a state in which the whole surface of the core is covered with the shell, but also a state in which part of the core surface is covered with the shell and part of the core surface is exposed. Also, the shell may be a monoatomic layer or atomic layers composed of two or more atoms stacked. From the viewpoint of increasing mass activity, the shell is preferably a monoatomic layer.

Hereinafter, the core-shell catalyst production method of the present invention will be explained in detail.

Figure 1:
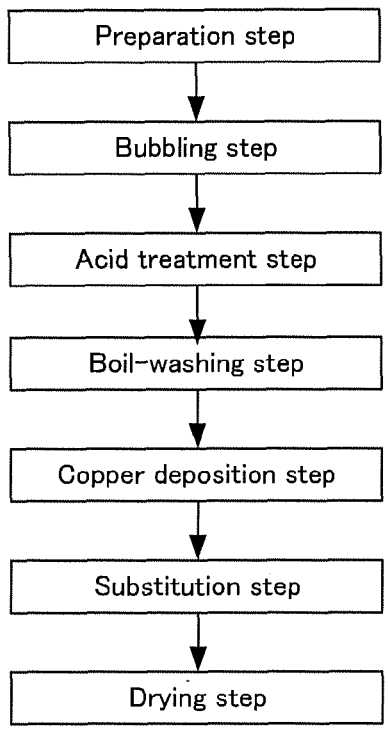
FIG. 1 is a flow chart of an example of the core-shell catalyst production method of the present invention.

FIG. 1 is a flow chart of an example of the core-shell catalyst production method of the present invention.

The core-shell catalyst production method shown in FIG. 1 includes (1) a preparation step, (2) a bubbling step, (3) an acid treatment step, (4) a boil-washing step, (5) a copper deposition step, (6) a substitution step and (7) a drying step.

The core-shell catalyst production method of the present invention includes at least (1) the preparation step, (2) the bubbling step, (3) the acid treatment step, (5) the copper deposition step and (6) the substitution step. As needed, it includes (4) the boil-washing step after the acid treatment step and before the copper deposition step, and (7) the drying step, etc., after the substitution step.

Hereinafter, these steps will be explained in order.

(1) Preparation Step

The preparation step is a step of preparing a dispersion in which a palladium-containing particle support, in which palladium-containing particles are supported on an electroconductive support, is dispersed in water.

The dispersion is not particularly limited, as long as it contains at least the palladium-containing particle support and water. It is preferable that the dispersion is composed of only the palladium-containing particle support and water.

The method for dispersing the palladium-containing particle support in water is not particularly limited. Examples thereof include a method of using a ultrasonic homogenizer.

As the palladium-containing particles, at least any one selected from palladium particles and palladium alloy particles can be used.

As the palladium alloy, examples include an alloy of palladium and a metal material selected from the group consisting of iridium, ruthenium, rhodium, iron, cobalt, nickel, copper, silver and gold. The metal (other than palladium) constituting the palladium alloy may be one or more kinds of metals.

It is preferable that the palladium content in the palladium alloy is 80 mass % or more, when the total mass of the palladium alloy is determined as 100 mass %. This is because a uniform platinum-containing shell can be formed when the palladium content is 80 mass % or more.

The average particle diameter of the palladium-containing particles is not particularly limited and is preferably 10 nm or less. When the average particle diameter of the palladium-containing particles is more than 10 nm, the surface area per mass of the platinum decreases, so that a large amount of platinum is needed to obtain necessary activity, and the cost is high. When the average particle diameter of the palladium-containing particles is too small, the palladium itself becomes more soluble and decreases the durability of the catalyst. Therefore, the average particle diameter of the palladium-containing particles is preferably 3.0 nm or more.

The method for calculating the average particle diameter of the particles used in the present invention is as follows. First, using a transmission electron microscope (TEM), a TEM image of particles is taken at a magnification of 1,000,000×. Then, the diameter of a true circle (equivalent circle particle diameter) having the same area as the area of one of the particles projected onto a plane is regarded as the particle diameter of the particle. Such a particle diameter measurement by the photographic observation is carried out on 500 particles of the same type, and the average of the diameters of the particles is regarded as the average particle diameter. Partly-photographed particles shown on the edges of the image are excluded from the analysis.

The standard deviation of the particle size distribution of the palladium-containing particles is not particularly limited and is preferably 2.0 nm or less. The smaller the standard deviation of the particle size distribution, the better.

The standard deviation of the particle size distribution of the palladium-containing particles can be calculated from the particle size distribution of the palladium-containing particles obtained by the TEM observation.

As the electroconductive support, examples include electroconductive carbonaceous materials such as carbon particles and carbon fibers, and metal materials such as metal particles and metal fibers. As the carbon particles, examples include Ketjen Black (product name; manufactured by: Ketjen Black International Company), Vulcan (product name; manufactured by: Cabot), Norit (product name; manufactured by: Norit), Black Pearls (product name; manufactured by: Cabot) and Acetylene Black (product name; manufactured by: Chevron).

The average particle diameter of the electroconductive support is not particularly limited. It is preferably 0.01 to several hundred micrometers (μm), and more preferably 0.01 to 1 μm. When the average particle diameter of the electroconductive support is less than the above range, the electroconductive support may corrode and deteriorate, so that the palladium-containing particles supported on the electroconductive support may be detached over time. When the average particle diameter of the electroconductive support is more than the range, the specific surface area thereof may be small, so that the dispersibility of the palladium-containing particles may decrease.

The specific surface area of the electroconductive support is not particularly limited. It is preferably 50 to 2000 $m^2/g$, and more preferably 100 to 1600 $m^2/g$. When the specific surface area of the electroconductive support is less than the range, the dispersibility of the palladium-containing particles into the electroconductive support decrease, and sufficient battery performance may not be exhibited. When the specific surface area of the electroconductive support is more than the range, the effective utilization rate of the palladium-containing particles may decrease, and sufficient battery performance may not be exhibited.

The palladium-containing particle supporting rate by the electroconductive support [{(mass of palladium-containing particles)/(mass of palladium-containing particles+mass of electroconductive support)}×100%] is not particularly limited. In general, it is preferably in a range of 20 to 60%. When the amount of the supported palladium-containing particles is too small, sufficient catalyst function may not be exhibited. On the other hand, when the amount of the supported palladium-containing particles is too large, any problem may not occur from the viewpoint of catalyst function; however, effects that are commensurate with an increase in production cost are less likely to be obtained, even when a higher-than-necessary amount of palladium-containing particles are supported.

The method for supporting the palladium-containing particles on the electroconductive support may be a conventional method. Examples thereof include the following method: an electroconductive support dispersion in which the electroconductive support is dispersed, is mixed with the palladium-containing particles, and the mixture is filtered, washed, redispersed in ethanol, etc., and then dried with a vacuum pump, etc. In the case of using palladium alloy particles, the synthesis of the alloy may be carried out concurrently with the supporting of the palladium alloy particles on the electroconductive support.

(2) Bubbling Step

The bubbling step is a step of bubbling hydrogen gas into the dispersion.

By the bubbling step, the palladium contained in the palladium-containing particles is allowed to occlude hydrogen, or a palladium oxide on the palladium-containing particle surface can be reduced to palladium.

The method for bubbling hydrogen gas into the dispersion is not particularly limited and can be a general method. Examples thereof include the following method: a hydrogen gas inlet tube is immersed in the dispersion, and hydrogen gas is introduced from a hydrogen gas supply source, thereby bubbling hydrogen gas into the dispersion.

The bubbling time is not particularly limited and is preferably one or more hours.

The hydrogen gas flow rate is not particularly limited and is preferably 50 to 500 $cm^3/min$.

It is preferable that the bubbling step is carried out in an inert gas atmosphere such as nitrogen atmosphere.

(3) Acid Treatment Step

The acid treatment step is a step of acid treating the palladium-containing particles after the bubbling step.

By the acid treatment, the fine palladium-containing particles in the palladium-containing particle support can be dissolved.

In the acid treatment step, generally, after the palladium-containing particles are acid-treated, the acid solution containing the palladium-containing particle support is filtered, and the thus-obtained palladium-containing particle support is washed with water.

By washing the palladium-containing particle support with water after the acid treatment, a so-called Ostwald ripening occurs, in which the hydrogen occluded in the palladium in the bubbling step reduces the dissolved palladium to redeposit the palladium on the relatively-large palladium-containing particles, and the palladium-containing particle supporting rate of the palladium-containing particle support can be increased.

The method for carrying out the acid treatment is not particularly limited. The palladium-containing particle support may be immersed in an acid solution, or the palladium-containing particle support may be dispersed in an acid solution.

At the time of carrying out the acid treatment, the temperature inside the system is not particularly limited and is preferably 50 to 80° C.

As the acid used for the acid treatment, examples include sulfuric acid, nitric acid, hydrochloric acid, chlorous acid, perchloric acid, oxalic acid, aqua regia and acetic acid. Preferred is at least one of sulfuric acid and nitric acid.

The concentration of the acid is not particularly limited and is preferably 0.1 to 1.0 M.

The acid treatment time is not particularly limited. It can be appropriately determined depending on the amount of the palladium-containing particles, the type of the acid, the concentration of the acid, the temperature inside the system, etc.

(4) Boil-Washing Step

The boil-washing step is a step of boil-washing the palladium-containing particles with water after the acid treatment step and before the copper deposition step.

By carrying out the boil-washing, the acid attached to the electroconductive support surface and the palladium-containing particle surface in the acid treatment step can be removed.

The boil-washing method is not particularly limited. Examples thereof include a method of dispersing the palladium-containing particle support in water after the acid treatment step and boiling the dispersion. Instead of washing the palladium-containing particle support with water in the acid treatment step, the palladium-containing particle support may be boil-washed in the boil-washing step.

The method for dispersing the palladium-containing particle support in water may be the same as the method described above under "(1) Preparation step".

The boil-washing time is not particularly limited and is preferably one or more hours.

(5) Copper Deposition Step

The copper deposition step is a step of depositing copper on the surface of the palladium-containing particles by applying a potential that is nobler than the oxidation reduction potential of copper to the palladium-containing particles in a copper ion-containing electrolyte after the acid treatment step.

The copper ion-containing electrolyte is not particularly limited, as long as it is an electrolyte in which copper can be deposited on the surface of the palladium-containing particles by Cu-UPD. The copper ion-containing electrolyte is generally composed of a solvent in which a predetermined amount of copper salt is dissolved. However, the electrolyte is not limited to this constitution and may be an electrolyte in which a part or all of the copper ions are separately present.

As the solvent used for the copper ion-containing electrolyte, examples include water and organic solvents. Water is preferred from the point of view that it does not prevent the deposition of copper on the surface of the palladium-containing particles.

As the copper salt used for the copper ion-containing electrolyte, examples include copper sulfate, copper nitrate, copper chloride, copper chlorite, copper perchlorate and copper oxalate.

The copper ion concentration of the electrolyte is not particularly limited and is preferably 10 to 1,000 mM.

In addition to the solvent and the copper salt, the copper ion-containing electrolyte may contain an acid, for example. As the acid that can be added to the copper ion-containing electrolyte, examples include sulfuric acid, nitric acid, hydrochloric acid, chlorous acid, perchloric acid and oxalic acid. Counter anions in the copper ion-containing electrolyte and counter anions in the acid can be the same kind or different kinds of counter anions.

It is also preferable to bubble an inert gas into the electrolyte in advance. This is because the palladium-containing particles can be inhibited from oxidation and can be uniformly covered with the platinum-containing shell. As the inert gas, nitrogen gas, argon gas, etc., can be used.

The palladium-containing particles may be immersed and dispersed in the electrolyte by adding the particles in a powdery state to the electrolyte, or the palladium-containing particles may be immersed and dispersed in the electrolyte by dispersing the particles in a solvent to prepare a palladium-containing particle dispersion and then adding the dispersion to the electrolyte.

As the solvent used for the palladium-containing particle dispersion, the same solvent as that used for the above-described copper ion-containing electrolyte can be used.

Also, the palladium-containing particles may be immersed in the electrolyte by fixing the particles on an electroconductive substrate or working electrode and then immersing a surface having the palladium-containing particles fixed thereon of the electroconductive substrate or working electrode in the electrolyte. To fix the palladium-containing particles, for example, the following method may be used: a paste containing the palladium-containing particles is prepared using an electrolyte resin (such as Nafion (trade name)) and a solvent (such as water or alcohol) and applied to a surface of the electroconductive substrate or working electrode, thereby fixing the palladium-containing particles.

The method for applying a potential to the palladium-containing particles is not particularly limited, and it can be a general method. Examples thereof include a method of immersing a working electrode, a counter electrode and a reference electrode in the copper ion-containing electrolyte and then applying a potential to the working electrode.

As the working electrode, for example, there may be used materials that can ensure electroconductivity, such as metal materials including titanium, a platinum mesh, a platinum plate and a gold plate, and electroconductive carbonaceous materials including glassy carbon and a carbon plate. Also, the reaction container can be formed with any of the electroconductive materials and used as the working electrode. When the reaction container made of a metal material is used as the working electrode, it is preferable that the inner wall of the reaction container is coated with $RuO_2$, from the viewpoint of preventing corrosion. When the reaction container made of a carbonaceous material is used as the working electrode, the container can be used as it is without any coating.

As the counter electrode, for example, there may be used a platinum black-plated platinum mesh and electroconductive carbon fibers.

As the reference electrode, for example, there may be used a reversible hydrogen electrode (RHE), a silver-silver chloride electrode and a silver-silver chloride-potassium chloride electrode.

As the potential control device, for example, there may be used a potentiostat and a potentio-galvanostat.

The applied potential is not particularly limited, as long as it is a potential that can deposit copper on the surface of the palladium-containing particles, that is, a potential that is nobler than the oxidation reduction potential of copper. For example, the applied potential is preferably in a range of 0.35 to 0.7 V (vs. RHE), particularly preferably 0.37 V (vs. RHE).

The potential applying time is not particularly limited. It is preferable to apply the potential for 60 minutes or more, and it is more preferable to apply the potential until reaction current becomes steady and close to zero.

From the viewpoint of preventing the oxidation of the surface of the palladium-containing particles and preventing the oxidation of the copper, it is preferable to carry out the copper deposition step under an inert gas atmosphere such as nitrogen atmosphere.

Also in the copper deposition step, it is preferable to appropriately stir the copper ion-containing electrolyte, as needed. For example, when the reaction container that functions as the working electrode is used and the palladium-containing particles are immersed and dispersed in the electrolyte in the reaction container, the palladium-containing particles can be brought into contact with the surface of the reaction container (working electrode) by stirring the electrolyte, and thus a uniform potential can be applied to the palladium-containing particles. In this case, the stirring can be carried out continuously or intermittently in the copper deposition step.

(6) Substitution Step

The substitution step is a step of forming the shell by substituting the copper deposited on the surface of the palladium-containing particles after the copper deposition step with platinum by bringing the copper deposited on the surface of the palladium-containing particles into contact with a platinum ion-containing solution.

In the substitution step, by bringing the copper deposited on the surface of the palladium-containing particles into contact with a platinum ion-containing solution, the copper can be substituted with platinum due to a difference in ionization tendency.

In the present invention, the shell contains platinum and/or a platinum alloy.

As the platinum alloy, examples include an alloy with a metal material selected from the group consisting of iridium, ruthenium, rhodium, nickel and gold. The metal (other than platinum) constituting the platinum alloy may be one or more kinds of metals.

It is preferable that the platinum content in the platinum alloy is 90 mass % or more, when the total mass of the platinum alloy is determined as 100 mass %. This is because sufficient catalytic activity and durability cannot be obtained when the platinum content is less than 90 mass %.

A platinum salt is used for the platinum ion-containing solution. Examples of the platinum salt include $K_2PtCl_4$ and $K_2PtCl_6$. Also, an ammonia complex such as ($[PtCl_4][Pt(NH_3)_4]$) can be used.

The platinum ion concentration of the platinum ion-containing solution is not particularly limited and is preferably 0.01 to 100 mM.

A solvent is used for the platinum ion-containing solution. The solvent can be the same as the solvent used for the copper ion-containing electrolyte described above. In addition to the solvent and the platinum salt, the platinum ion-containing solution may also contain an acid, etc. Examples of the acid include sulfuric acid, nitric acid, hydrochloric acid, chlorous acid, perchloric acid and oxalic acid.

The platinum ion-containing solution is sufficiently stirred in advance. From the viewpoint of preventing the oxidation of the surface of the palladium-containing particles or preventing the oxidation of the copper, it is preferable to bubble nitrogen into the solution in advance.

The substitution time (contact time between the platinum ion-containing solution and the palladium-containing particles) is not particularly limited and is preferably 10 minutes or more. Since the potential of the reaction solution is increased by adding the platinum ion-containing solution, it is more preferable to continue the substitution until the potential monitored shows no change.

When the copper deposition step and the substitution step are carried out in the same reaction container, it is allowed that after the copper deposition step, the potential control is stopped, and the platinum ion-containing solution is added to the copper ion-containing electrolyte used in the copper deposition step, thereby bringing the palladium-containing particles on which copper is deposited into contact with the platinum ion-containing solution.

(7) Drying Step

The drying step is a step of washing and drying the core-shell catalyst obtained after the substitution step.

The method for washing the thus-obtained core-shell catalyst is not particularly limited, as long as it is a method that is able to remove impurities without any damage to the core-shell structure of the core-shell catalyst. As the washing method, examples include a suction filtration method using water, perchloric acid, dilute sulfuric acid, dilute nitric acid, etc.

The method for drying the core-shell catalyst is not particularly limited, as long as it is a method that is able to remove solvents, etc. Examples thereof include a method of keeping a temperature of 50 to 100° C. for 6 to 12 hours in an inert gas atmosphere.

As needed, the core-shell catalyst may be pulverized. The pulverization method is not particularly limited, as long as it is a method that is able to pulverize solids. As the pulverization, examples include pulverization using a mortar, etc., in an inert gas atmosphere or in the air, and mechanical milling such as a ball mill, a turbo mill or a jet mill.

EXAMPLES

Example 1

First, a palladium-supported carbon (Pd/C) (Pd supporting rate 29.8 mass %) was prepared, in which palladium particles having a standard deviation of 1.4 nm, an average particle diameter of 2.6 nm and an electrochemical surface area of 68 $m^2$/g-Pd are supported on carbon particles.

Figure 2:
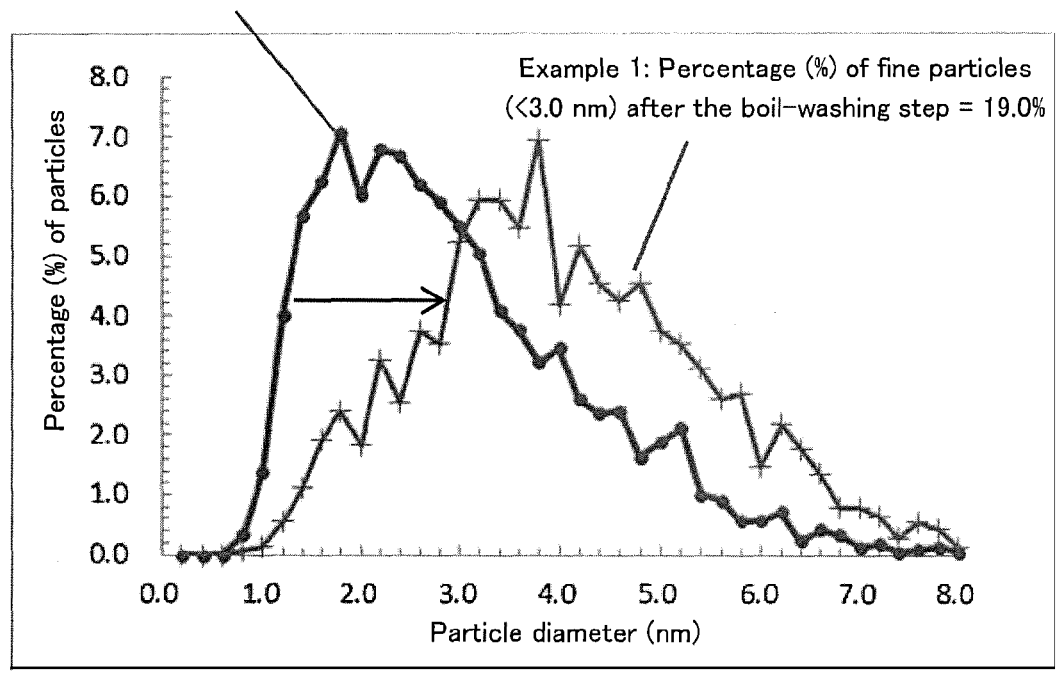
FIG. 2 is a view showing the particle size distribution of palladium particles in Pd/C before a preparation step in Example 1 and the particle size distribution of the palladium particles in the Pd/C after a boil-washing step in Example 1.

The particle size distribution of the palladium particles in the Pd/C was obtained by TEM observation. The results are shown in FIG. 2. FIG. 2 is a graph with the particle diameter (nm) on the horizontal axis and the percentage (%) of the particles on the vertical axis.

[Electrochemical Surface Area]

The electrochemical surface area (ECSA) of the palladium was calculated by carrying out cyclic voltammetry (CV) measurement on the Pd/C.

First, 30 mg of the Pd/C was collected and dispersed in a mixed solution of 131.25 μL of a 5% Nafion (trade name) dispersion, 30 mL of ultrapure water and 7.5 mL of isopropanol to prepare a catalyst ink. The catalyst ink was applied to a glassy carbon electrode (RDE) and dried. Then, CV measurement was carried out.

CV measurement conditions are as follows.
Electrolyte: 0.1 M perchloric acid aqueous solution (saturated with Ar in advance by Ar gas bubbling)
Atmosphere: In an Ar atmosphere
Sweep rate: 50 mV/sec
Potential sweep range: 0.05 to 1.2 V (vs. RHE)

From a cyclic voltammogram thus obtained, hydrogen desorption peaks were integrated to obtain a charge amount (C).

From the concentration and amount of the catalyst ink applied to the glassy carbon electrode, the mass (g) of the palladium was calculated.

The electrochemical surface area ($m^2$/g-Pd) of the palladium was calculated from the value obtained by dividing the charge amount (C) obtained from the hydrogen desorption peaks by the charge amount (C/$m^2$) per unit active surface area of the palladium and the mass (g) of the palladium.

[Preparation Step]

In this step, 1 g of the Pd/C was put in a reaction container, mixed with 1.0 L of ultrapure water and dispersed with a ultrasonic homogenizer.

[Bubbling Step]

The reaction container was hermetically closed. $H_2$ gas was bubbled into the dispersion in which the Pd/C was dispersed, at a flow rate of 100 $cm^3$/min for one hour. Then, the dispersion was filtered to collect solids.

[Acid Treatment Step]

After the bubbling step, the solids were put in 1 mol/L nitric acid and dispersed with a ultrasonic homogenizer, thereby preparing a nitric acid dispersion. The nitric acid dispersion was prepared so that the solid content concentration of the nitric acid dispersion medium reaches 1 g/L. The nitric acid dispersion was stirred at 50° C. for 30 minutes. Then, the nitric acid dispersion was filtered with ultrapure water to collect solids.

[Boil-Washing Step]

After the acid treatment step, the solids were put in 1.0 L of ultrapure water and dispersed with a ultrasonic homogenizer. A dispersion thus obtained was boiled for one hour.

After the boil-washing, the dispersion was filtered to obtain Pd/C. The standard deviation, average particle diameter and electrochemical surface area of the palladium particles in the Pd/C and the Pd supporting rate of the Pd/C were measured. The results are shown in Table 1. Table 1 also shows the standard deviation, average particle diameter and electrochemical surface area of the palladium particles in the Pd/C before the preparation step, and the Pd supporting rate of the Pd/C before the preparation step.

As shown in Table 1, for the palladium particles in the Pd/C after the boil-washing step in Example 1, the standard deviation is 1.4 nm; the average particle diameter is 4.1 nm; and the electrochemical surface area is 55 $m^2$/g-Pd. The Pd supporting rate of the Pd/C is 29.2 mass %.

Also, the particle size distribution of the palladium particles in the Pd/C after the boil-washing step was obtained by TEM observation. The results are shown in FIG. 2.

[Copper Deposition Step]

Then, the thus-obtained Pd/C was put in a reaction container, mixed with 1.0 L of a 0.05 M sulfuric acid aqueous solution and suspended.

Then, a working electrode (carbon plate), a counter electrode (platinum mesh) and a reference electrode (silver-silver chloride) were placed in the reaction container so as to be immersed in the sulfuric acid aqueous solution.

With bubbling nitrogen into the sulfuric acid in the reaction container, copper sulfate pentahydrate was added to the reaction solution so as to reach a copper ion concentration of 50 mM.

Then, a potentiostat was connected to the working, counter and reference electrodes. The potential of the working electrode was fixed at 0.37 V (vs. RHE) to deposit copper on the palladium particle surface. Sometimes, the solution in the reaction container was stirred with a stirrer. The potential was kept applied until the reaction current became steady and close to zero.

[Substitution Step]

The potential control was stopped. With stirring the solution in the reaction container with the stirrer, a sulfuric acid solution of $K_2PtCl_4$ was slowly added thereto. After the addition was completed, the solution was kept stirred until the self-potential in the reaction container reach a plateau (that is, until the self-potential shows no variation), thereby substituting the copper on the palladium particle surface with platinum. The sulfuric acid solution of $K_2PtCl_4$ was prepared by dissolving $K_2PtCl_4$ in 500 mL of a 0.05 M sulfuric acid solution so as to reach a platinum ion concentration of 2 mM. The sulfuric acid solution of $K_2PtCl_4$ was subjected to nitrogen bubbling in advance before it was put in the reaction container.

[Drying Step]

After the substitution step, the solution in the reaction container was filtered to collect a powder. Then, 4 L of pure water at normal temperature was added to the collected powder in ten batches to filter and wash the powder.

Then, the mixture was dried at 60° C. for 12 hours and pulverized with an agate mortar and a pestle, thereby obtaining a core-shell catalyst.

Comparative Example 1

A core-shell catalyst was produced in the same manner as Example 1, except the following: the preparation step, the bubbling step, the acid treatment step and the boil-washing step were not carried out; a Pd/C that is the same as the Pd/C prepared as a raw material in Example 1 was prepared; and the Pd/C was sintered at 500° C. for one hour in an inert gas atmosphere before the copper substitution step. The average particle diameter of the palladium particles in the Pd/C after the sintering and before the copper substitution step in Comparative Example 1, the standard deviation of the particle size distribution thereof, the electrochemical surface area thereof, and the Pd supporting rate of the Pd/C were measured. The results are shown in Table 1.

As shown in Table 1, the Pd supporting rate of the Pd/C after the sintering and before the copper deposition step in Comparative Example 1 is 29.4 mass %; the average particle diameter of the palladium particles in the Pd/C is 4.2 nm; the standard deviation of the particle size distribution thereof is 1.8 nm; and the electrochemical surface area thereof is 52 m²/g-Pd.

Comparative Example 2

A core-shell catalyst was produced in the same manner as Example 1, except that the preparation step, the bubbling step and the boil-washing step were not carried out.

The average particle diameter of the palladium particles in the Pd/C after the acid treatment step and before the copper deposition step in Comparative Example 2, the standard deviation of the particle size distribution thereof, the electrochemical surface area thereof, and the Pd supporting rate of the Pd/C were measured. The results are shown in Table 1.

As shown in Table 1, the Pd supporting rate of the Pd/C after the acid treatment step and before the copper deposition step in Comparative Example 2 is 25.4 mass %; the average particle diameter of the palladium particles in the Pd/C is 3.1 nm; the standard deviation of the particle size distribution thereof is 1.6 nm; and the electrochemical surface area thereof is 58 m²/g-Pd.

Comparative Example 3

A core-shell catalyst was produced in the same manner as Example 1, except that the preparation step, the bubbling step, the acid treatment step and the boil-washing step were not carried out.

Comparative Example 4

A core-shell catalyst was produced in the same manner as Example 1, except that a Pd/C (Pd supporting rate 29.8 mass %) in which palladium particles having an average particle diameter of 1.4 nm and a standard deviation of 0.4 nm are supported on carbon particles was prepared, and the preparation step, the bubbling step, the acid treatment step and the boil-washing step were not carried out.

Figure 3:
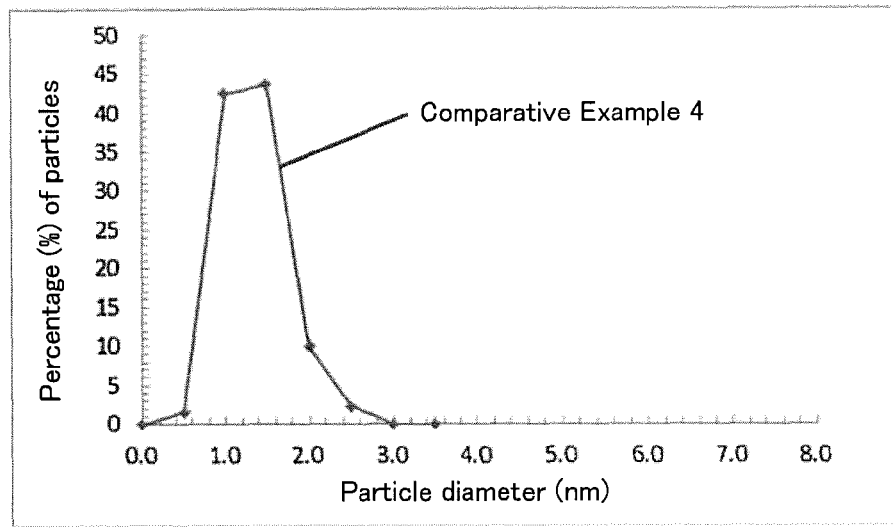
FIG. 3 is a view showing the particle size distribution of palladium particles in Pd/C in Comparative Example 4.

The particle size distribution of the palladium particles in the Pd/C in Comparative Example 4 was obtained by TEM observation. The result is shown in FIG. 3. FIG. 3 is a graph with particle diameter (nm) on the horizontal axis and particle percentage (%) on the vertical axis.

As shown in FIG. 3, it is clear that all of the palladium particles in the Pd/C that is a raw material in Comparative Example 4, have a particle diameter of less than 3.0 nm.

TABLE 1

| Pd/C | Pd supporting rate (mass %) | Average particle diameter (nm) of Pd | Standard deviation (nm) of Pd | ECSA (m²/g-Pd) |
|---|---|---|---|---|
| Example 1 (Before preparation step) | 29.8 | 2.6 | 1.4 | 68 |
| Example 1 (After boil-washing step) | 29.2 | 4.1 | 1.4 | 55 |
| Comparative Example 1 | 29.4 | 4.2 | 1.8 | 52 |
| Comparative Example 2 | 25.4 | 3.1 | 1.6 | 58 |

As shown in Table 1, from a comparison between the Pd/C before the preparation step in Example 1 and the Pd/C sintered in Comparative Example 1, it is clear that in Comparative Example 1, the Pd supporting rate of the Pd/C decreased only by 0.4 mass % (=29.8−29.4) and the average particle diameter of the palladium particles in the Pd/C increased by 1.6 nm (=4.2−2.6). In accordance with this, the electrochemical surface area of the palladium particles in the Pd/C decreased by 16 m²/g-Pd (=68−52). However, the standard deviation of the particle size distribution of the palladium particles in the Pd/C increased by 0.4 nm (=1.8−1.4).

From a comparison between the Pd/C before the preparation step in Example 1 and the Pd/C subjected to only the acid treatment in Comparative Example 2, it is clear that in Comparative Example 2, the average particle diameter of the palladium particles in the Pd/C increased by 0.5 nm (=3.1−2.6). In accordance with this, the electrochemical surface area of the palladium particles in the Pd/C decreased by 10 m²/g-Pd (=68−58). However, the standard deviation of the particle size distribution of the palladium particles in the Pd/C increased by 0.2 nm (=1.6−1.4) and the Pd supporting rate of the Pd/C significantly decreased by 4.4 mass % (=29.8−25.4).

Meanwhile, from a comparison between the Pd/C before the preparation step in Example 1 and the Pd/C after the boil-washing step in Example 1, it is clear that after the boil-washing step in Example 1, the Pd supporting rate of the Pd/C decreased only by 0.6 mass % (=29.8−29.2) and the average particle diameter of the palladium particles in the Pd/C increased by 1.5 nm (=4.1−2.6). In accordance with this, the electrochemical surface area of the palladium particles in the Pd/C decreased by 13 m²/g-Pd (=68−55). Moreover, the standard deviation of the particle size distribution of the palladium particles in the Pd/C could be maintained.

As shown in FIG. 2, from a comparison between the particle size distribution of the palladium particles in the Pd/C before the preparation step in Example 1 and the particle size distribution of the palladium particles in the Pd/C after the boil-washing step in Example 1, it is clear that while the percentage of the fine palladium particles having a particle diameter of less than 3.0 nm was 67% before the preparation step in Example 1, the percentage of the fine palladium particles having a particle diameter of less than 3.0 nm decreased to 19% after the boil-washing step in Example 1.

Therefore, from Table 1 and FIG. 2, it is clear that by carrying out the acid treatment step after the bubbling step, the fine palladium particles having a particle diameter of less than 3.0 nm could be reduced, without decreasing the Pd supporting rate of the Pd/C and without increasing the standard deviation of the particle size distribution of the palladium particles in the Pd/C.

[Pd Elution Test]

For the core-shell catalysts of Example 1 and Comparative Examples 3 and 4, the solubility of the palladium was examined.

Figure 4:
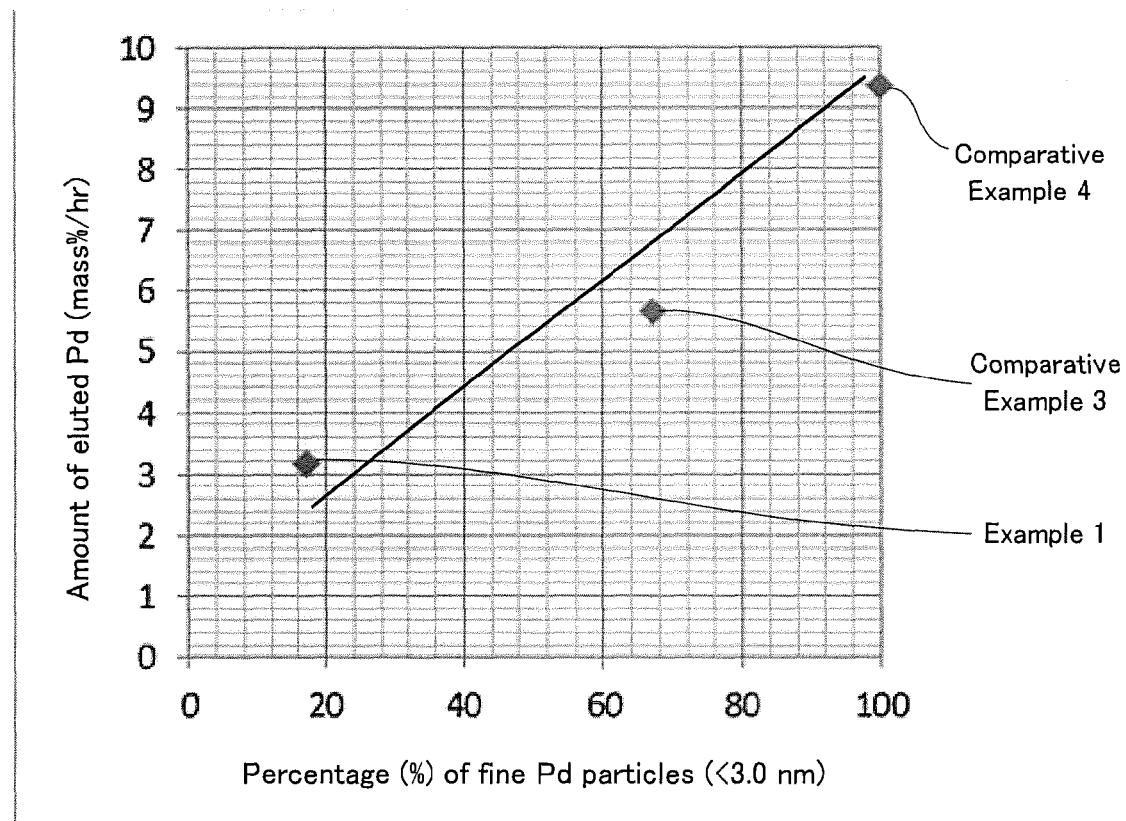
FIG. 4 is a view showing the relationship between the percentage of fine palladium particles having a particle diameter of less than 3.0 nm and the amount of eluted palladium.

First, 50 mg of the core-shell catalyst obtained in Example 1 was prepared, put in 300 mL of a 0.1 M sulfuric acid aqueous solution, and stirred and suspended at 80° C. for one hour. Then, a suspension thus obtained was filtered. For a filtrate thus obtained, the palladium element eluted into the sulfuric acid was quantitated by inductively coupled plasma mass spectroscopy (ICP-MS) and the amount of the palladium eluted into the sulfuric acid by the suspending was calculated. The amount of the eluted palladium was expressed as the mass of the palladium eluted per hour (mass %/hr) with respect to the total amount of the palladium suspended in the sulfuric acid. Also, Comparative Examples 3 and 4 were tested in the same manner as above. The results are shown in FIG. 4. FIG. 4 is a view showing the relationship between the percentage of fine palladium particles having a particle diameter of less than 3.0 nm and the amount of eluted palladium.

As shown in FIG. 4, the amount of the eluted palladium is 3.2 mass %/hr for the core-shell catalyst in Example 1; 5.7 mass %/hr for the core-shell catalyst in Comparative Example 3; and 9.4 mass %/hr for the core-shell catalyst in Comparative Example 4.

Therefore, it is clear that the amount of the eluted palladium increases as the percentage of the fine palladium particles having a particle diameter of less than 3.0 nm increases (that is, in the following order: Example 1<Comparative Example 3<Comparative Example 4). It is also clear that the amount of the eluted palladium can be decreased by decreasing the fine palladium particles having a particle diameter of less than 3.0 nm in advance.

[Mass Activity Evaluation]

Samples (30 mg each) were taken from the core-shell catalysts obtained in Example 1 and Comparative Example 3. Each core-shell catalyst sample was dispersed in a mixed solution of 131.25 µL of a 5% Nafion (trade name) dispersion, 30 mL of ultrapure water, and 7.5 mL of isopropanol, thereby producing a catalyst ink. The catalyst ink was applied onto the glassy carbon electrode of a rotating disk electrode (RDE) and naturally dried.

Then, oxidation-reduction reaction (ORR) measurement was carried out on each core-shell catalyst.

ORR measurement conditions are as follows.
Electrolyte: 0.1 M perchloric acid aqueous solution (saturated with oxygen in advance by oxygen gas bubbling)
Atmosphere: In the air atmosphere
Sweep rate: 50 mV/sec (without any pre-conditioning interim operation)
Potential sweep range: 1.05 to 0.1 V (vs. RHE)
Rotational frequency: 1600 rpm From an oxygen reduction wave obtained by the ORR measurement, the catalytic activity (MA) per unit mass of the platinum in each core-shell catalyst was measured.

The catalytic activity (A/g-Pt) per unit mass of the platinum in each core-shell catalyst was obtained as follows: in the oxygen reduction wave obtained by the ORR measurement, the current value at 0.9 V (vs. RHE) in the second cycle was determined as oxygen reduction current ($I_{0.9}$), and the current value at 0.35 V (vs. RHE) in the same cycle was determined as diffusion limited current ($I_{lim}$); an activation controlled current (Ik) was obtained by the following formula (1); and the catalytic activity (A/g-Pt) per unit mass of the platinum was calculated by dividing Ik (A) by the platinum amount (g) contained in the core-shell catalyst applied onto the glassy carbon electrode.

$$Ik = (I_{lim} \times I_{0.9})/(I_{lim} - I_{0.9})$$ [Formula (1)]

The meaning of the symbols in the formula (1) are as follows:
Ik: Activation controlled current (A)
$I_{lim}$: Diffusion limited current (A)
$I_{0.9}$: Oxygen reduction current (A)

The catalytic activity per unit mass of the platinum is 760 A/g-Pt in Example 1 and 667 A/g-Pt in Comparative Example 3.

[RDE Performance Evaluation]

Using the mass activities measured by the RDE, the current density at a voltage of 0.88 V of Example 1 and that of Comparative Example 3 were estimated from the current density at a voltage of 0.88 V obtained by power generation of a fuel cell in which a platinum-supported carbon (Pt/C) having the same mass activity as Example 1 and Comparative Example 3 is used in the catalyst layer of the fuel cell.

The estimated current density value at a voltage of 0.88 V is 28.5 mA/cm$^2$ in Example 1 and 25.0 mA/cm$^2$ in Comparative Example 3.

[MEA Performance Evaluation]

Samples were taken from the core-shell catalysts obtained in Example 1 and Comparative Example 3. Each sample was mixed with a perfluorocarbon sulfonic acid resin (product name: Nafion; manufactured by: DuPont), ethanol and water, and the mixture was stirred well, thereby preparing a catalyst ink.

The catalyst ink was sprayed to both sides of a perfluorocarbon sulfonic acid resin membrane. The applied catalyst ink was dried to form catalyst layers on both sides of the membrane, thereby obtaining a membrane catalyst layer assembly.

The thus-obtained membrane catalyst layer assembly was sandwiched between carbon papers for use as gas diffusion layers and hot-pressed, thereby obtaining a membrane electrode assembly. The membrane electrode assembly was sandwiched between two separators (made of carbon), thereby producing a fuel cell.

The thus-obtained fuel cell was caused to generate electric power in the following conditions.
Anode gas: Hydrogen gas at a relative humidity (RH) of 100% (bubbler dew point 80° C.)
Cathode gas: Air at a relative humidity (RH) of 100% (bubbler dew point 80° C.)
Cell temperature (cooling water temperature): 80° C.

A current density-voltage curve was obtained by the power generation. The current density at a voltage of 0.88 V is 24.2 mA/cm$^2$ in Example 1 and 15.8 mA/cm$^2$ in Comparative Example 3.

[Comparison Between RDE Performance and MEA Performance]

Figure 5:
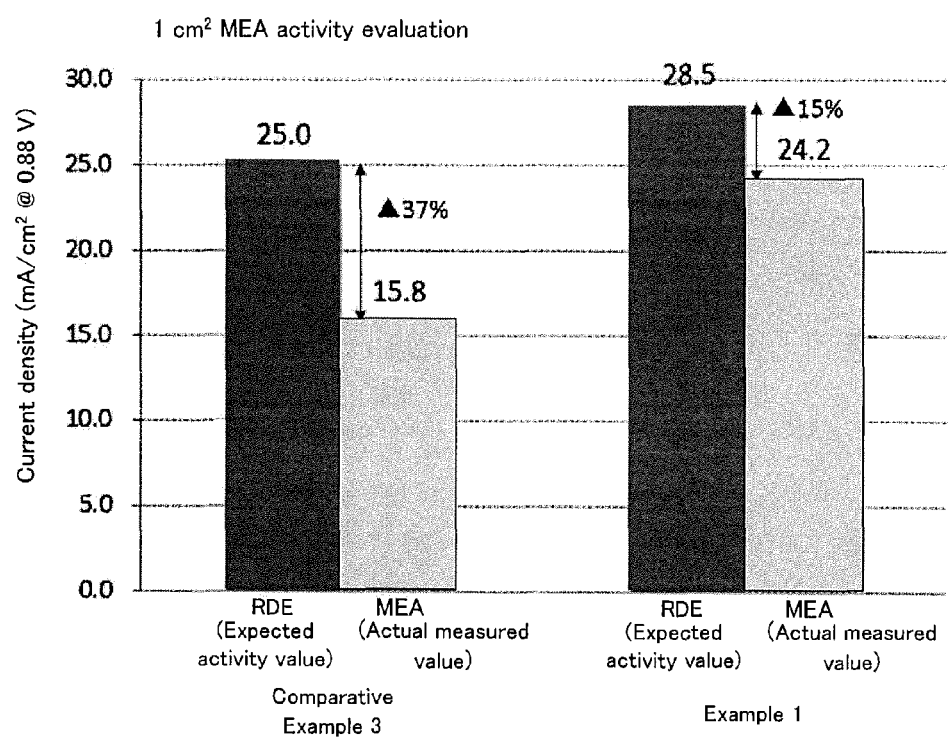
FIG. 5 is a view showing the results of RDE and MEA evaluations for the core-shell catalysts of Example 1 and Comparative Example 3.

The estimated current density value (expected activity value) calculated from the mass activity measured with the RDE, was determined as the electrode performance (RDE performance) of the core-shell catalyst in the form of powder. The actual measured value calculated from the current density-voltage curve obtained by the power generation of the fuel cell, was determined as the electrode performance (MEA performance) of the membrane electrode assembly formed by use of the core-shell catalyst. The RDE performance and the MEA performance of the core-shell catalyst were compared to each other. The results are shown in FIG. 5. In FIG. 5, dark gray bar graphs indicate expected RDE activity values, and light gray bar graphs indicate actual MEA measurement values.

As shown in FIG. 5, it is clear that the MEA performance of Comparative Example 3 in which the fine palladium particles having a particle diameter of less than 3.0 nm were not decreased in advance, is about 37% (=(25.0−15.8)/25.0× 100) lower than the RDE performance.

Meanwhile, the MEA performance of Example 1 in which the fine palladium particles having a particle diameter of less than 3.0 nm were decreased in advance, is about 15% (=(28.5−24.2)/28.5×100) lower than the RDE performance.

Therefore, for Example 1, it is clear that the difference between the RDE performance and the MEA performance is smaller than Comparative Example 3, and the MEA performance is higher than Comparative Example 3. Also, the small difference between the RDE performance and the MEA performance indicates that the eluted palladium was reduced in the MEA performance evaluation, and the influence exerted by the elution of the palladium was small.

What is claimed is:

1. A method for producing a core-shell catalyst comprising a core containing palladium and a shell containing platinum and covering the core, wherein the method comprises:
- a step of preparing a dispersion in which a palladium-containing particle support, in which palladium-containing particles are supported on an electroconductive support, is dispersed in water;
- a bubbling step of bubbling hydrogen gas into the dispersion;
- an acid treatment step of acid treating the palladium-containing particles after the bubbling step;
- a copper deposition step of depositing copper on the surface of the palladium-containing particles by applying a potential that is nobler than the oxidation reduction potential of copper to the palladium-containing particles in a copper ion-containing electrolyte after the acid treatment step; and
- a substitution step of forming the shell by substituting the copper deposited on the surface of the palladium-containing particles after the copper deposition step with platinum by bringing the copper deposited on the surface of the palladium-containing particles into contact with a platinum ion-containing solution.

2. The method for producing the core-shell catalyst according to claim 1, wherein the method further comprises a boil-washing step of boil-washing the palladium-containing particles with water after the acid treatment step and before the copper deposition step.

3. The method for producing the core-shell catalyst according to claim 1, wherein the acid is at least one selected from the group consisting of sulfuric acid and nitric acid.

4. The method for producing the core-shell catalyst according to claim 1, wherein the electroconductive support comprises at least one of a carbonaceous material and a metal material.

* * * * *